(12) United States Patent
Ludwig et al.

(10) Patent No.: US 9,560,669 B2
(45) Date of Patent: *Jan. 31, 2017

(54) METHOD AND DEVICES FOR SPECIFYING THE QUALITY OF SERVICE IN A TRANSMISSION OF DATA PACKETS

(71) Applicant: Telefonaktiebolaget L M Ericsson (publ), Stockholm (SE)

(72) Inventors: Reiner Ludwig, Hürtgenwald (DE); Per Willars, Vaxholm (SE); Hannes Ekstrom, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/943,506

(22) Filed: Nov. 17, 2015

(65) Prior Publication Data

US 2016/0073424 A1    Mar. 10, 2016

Related U.S. Application Data

(60) Continuation of application No. 13/403,085, filed on Feb. 23, 2012, now Pat. No. 9,198,085, which is a
(Continued)

(51) Int. Cl.
*H04W 28/24* (2009.01)
*H04W 72/12* (2009.01)

(52) U.S. Cl.
CPC ......... *H04W 72/1236* (2013.01); *H04W 28/24* (2013.01); *H04W 72/1278* (2013.01)

(58) Field of Classification Search
None
See application file for complete search history.

(56) References Cited

U.S. PATENT DOCUMENTS 6,240,445 B1   5/2001   Kumar et al.
6,621,793 B2   9/2003   Widegren et al.
(Continued)

FOREIGN PATENT DOCUMENTS

EP   1250022 A1    10/2002
JP   2006514510 A   4/2006

OTHER PUBLICATIONS

Blake, S. et al., "An Architecture for Differentiated Services", Network Working Group, Request for Comments: 2475, Category: Informational, Dec. 1998, pp. 1-33, The Internet Society.
(Continued)

*Primary Examiner* — Alex Skripnikov
(74) *Attorney, Agent, or Firm* — Coats & Bennett, PLLC

(57) ABSTRACT

A method for specifying the quality of service in a transmission of data packets between a service entity (AF1) and a user equipment over a mobile network is described. The mobile network comprises a core network node (SGSN1) and an access node (NB1, RNC1) which are adapted to control the handling of data packets sent between the service entity (AF1) and the user equipment (UE1). A plurality of service classes relating to the quality of service are preconfigured and a selected service class is selected from said plurality for the transmission. A first transmission context (PDP1) is established between the core network node and the user equipment (UE1), said first transmission context being associated with a first set of attributes for defining a first quality of service for the exchange of the data packets with the user equipment in the transmission. Furthermore, a second transmission context (RAB1, RB1) is established between the access node (NB1, RNC1) and the user equipment (UE1), said second transmission context being associated with a second set of attributes for defining a second quality of service for the exchange of the data packets with the user equipment in the transmission. The selected service
(Continued)

class determines the first set of attributes by a first unique mapping function performed in the core network node and the selected service class determines the second set of attributes by a second unique mapping function performed in the access node. A corresponding mobile network, control device and computer program are also described.

20 Claims, 4 Drawing Sheets

Related U.S. Application Data division of application No. 12/096,855, filed as application No. PCT/EP2005/013320 on Dec. 12, 2005, now Pat. No. 8,175,074.

(56) References Cited

U.S. PATENT DOCUMENTS

| | | | |
|---|---|---|---|
| 6,845,095 B2 | 1/2005 | Krishnarajah et al. | |
| 6,845,100 B1 | 1/2005 | Rinne | |
| 7,031,718 B2 | 4/2006 | Jouppi et al. | |
| 7,525,938 B2 | 4/2009 | Hurtta | |
| 9,198,085 B2 * | 11/2015 | Ludwig et al. | H04W 28/24 |
| 2002/0071389 A1 | 6/2002 | Seo | |
| 2002/0093936 A1 | 7/2002 | Chuah | |
| 2002/0132611 A1 | 9/2002 | Immonen et al. | |
| 2003/0039237 A1 | 2/2003 | Forslow | |
| 2004/0153551 A1 | 8/2004 | Haumont | |
| 2004/0264376 A1 | 12/2004 | Schrodi | |
| 2006/0135172 A1 | 6/2006 | Dronne et al. | |
| 2007/0204050 A1 * | 8/2007 | Liu | H04L 12/5695 709/230 |
| 2008/0279139 A1 | 11/2008 | Beziot et al. | |

OTHER PUBLICATIONS

Lemon, T. et al., "The Classless Status Route Option for Dynamic Host Configuration Protocol (DHCP) version 4", Network Working Group, Request for Comments: 3442, Updates: 2132, Category: Standards Track, Dec. 2002, pp. 1-9, The Internet Society.

3rd Generation Partnership Project, "Technical Specification Group Services and System Aspects; Quality of Service (QoS) concept and architecture (Release 6)", 3GPP TS 23.107 V6.3.0, Jun. 2005, pp. 1-40.

3rd Generation Partnership Project, "Technical Specification Group Radio Access Network; Common test environments for User Equipment (UE); Conformance testing (Release 6)", 3GPP TS 34.108 V6.0.0, Oct. 2010, pp. 1-27.

* cited by examiner

METHOD AND DEVICES FOR SPECIFYING THE QUALITY OF SERVICE IN A TRANSMISSION OF DATA PACKETS

RELATED APPLICATIONS

The present application is a continuation of U.S. patent application Ser. No. 13/403,085, which was filed on Feb. 23, 2012, which application is a divisional of U.S. patent application Ser. No. 12/096,855, which was filed on Nov. 5, 2008, which issued as U.S. Pat. No. 8,175,074 on May 8, 2012, which is a national stage application of PCT/EP2005/013320, filed Dec. 12, 2005, the disclosures of each of which are incorporated herein by reference in their entirety.

TECHNICAL FIELD

The present invention relates to a method for specifying the quality of service in a transmission of data packets between a service entity and a user equipment over a mobile network comprising a core network node and an access node which are adapted to control the handling of data packets sent between the service entity and the user equipment. Devices and software programs embodying the invention are also described.

BACKGROUND

In many cases, data packets need to be sent between a mobile user equipment and a service entity. Transmissions can be performed both in downlink and uplink direction. For example, a server may send different packet flows for sound and video to the user equipment in a streaming session. The user equipment may send data to the service entity or may initiate a streaming session by control signaling. The service entity can also be another mobile user equipment. The transmission is performed over a mobile network and the service entity may be either part of the mobile network or it is able to exchange data packets with the network.

Customary mobile networks comprise a core network with core network nodes, e.g. a serving general packet radio service support node (SGSN) or a gateway general packet radio service support node (GGSN). The core network nodes allow the exchange of data with external networks such as the Internet or mobile or fixed networks of other operators. Furthermore, customary mobile networks comprise one or more access networks with access network nodes for controlling the radio transmission to the user equipment, commonly designated, e.g., as base station controllers, radio network controllers (RNC), Node B or base transceiver stations.

Depending on the type of packet traffic, the requirements for the transmission differ significantly. For example, voice transmission requires low delay and jitter while a limited amount of errors can be acceptable. Streaming sessions using packet buffers typically allow higher delays and jitter and the receiver can generally also correct or hide errors while file transfer can often be performed as best-effort traffic but normally requires error-free data. In addition, operators may choose to offer different qualities of service (QoS) depending on the user's subscription, i.e. they may choose to perform user differentiation. Accordingly, the provision of a defined quality of service is an important concept in the control of data traffic as described for example in technical specification 3GPP 23.107 V 6.3.0. of the $3^{rd}$ Generation Partnership Project "Quality of Service (QoS) concept and architecture".

The quality of service relating to a data transmission involving nodes of the mobile network and the user equipment is defined in different contexts. The user equipment and a core network node negotiate a PDP (Packet Data Protocol) context which specifies parameters for the transmission of data packets to and from the user equipment. In addition, further contexts are set up for different links between the service entity and the user equipment, e.g. a radio bearer between an access node and the user equipment, which specifies the transmission parameters on the radio link. The parameters of the further contexts are normally determined according to the PDP context. Packet flows between the service entity and the user equipment are then mapped to these contexts and forwarded accordingly.

The different contexts all involve attributes for specifying individual parameters of the traffic. In present mobile networks a plurality of such attributes is defined and they may either indicate binary or numerical values. Accordingly, a high number of possible combinations for the values of such attributes exist. In the negotiation or specification of the attributes for a context, also the user equipment can be involved. Depending on manufacturer, model and software, the user equipment can have different requirements and behavior in the specification procedure of the context, i.e. the setting of the attributes can also depend on the user equipment. This problem may partly be overcome by performing a specific configuration for the user equipment according to network operator, user equipment manufacturer and type. This is, however, inconvenient for the user and solves this problem only partly.

The differentiated services concept allows marking in the header of a data packet which quality of service should be used when handling the packet. A corresponding header field is for example defined in different versions of the Internet Protocol (IP). However, the marking of the data packets does not allow to forward quality of service information to all nodes controlling the quality of a data transmission in a mobile network because not all nodes are adapted to evaluate the headers. For example if the packet transmission involves packet fragmentation and/or encryption with later reassembly or decryption, the headers are normally not accessible to nodes handling encrypted packets or packet fragments.

Accordingly, it is a problem to specify the quality of service which the nodes in a mobile network use for the handling of data packets. In addition, it is also difficult for operators to specify how the resources controlled by the nodes in a mobile network are shared between different levels of the quality of service.

SUMMARY

It is an object of the present invention to provide a simple solution for specifying the quality of service for the handling of data packets in a mobile network.

According to the invention, the method described in claim 1 is performed. Furthermore, the invention is embodied in a mobile network as described in claim 9, a control device as described in claim 10 and a computer program as described in claim 13. Advantageous embodiments are described in the dependent claims.

In the proposed method, data packets are transmitted between a service entity and a user equipment over a mobile network. The mobile network comprises a core network node and an access node which are adapted to control the handling of data packets sent between the service entity and the user equipment. The data packets may be forwarded by the access node and the core network node. In addition or alternatively, further entities under control of one of the nodes may handle the data packets, e.g. a scheduler in a Node B which is controlled by an RNC as access node.

A plurality of service classes relating to the quality of service is preconfigured. For example, the operator may choose to use a specified number of preconfigured service classes for transmission in the mobile network and to perform all packet transmissions according to one of the preconfigured service classes. A selected service class is selected from said plurality of service classes for the transmission. For example the selection can be performed by the service entity in view of the required quality of service for a specific packet flow or group of flows.

A first transmission context is established between the core network node and the user equipment. The first transmission context is associated with a first set of attributes for defining a first quality of service for the exchange of the data packets with the user equipment in the transmission. The selected service class determines the first set of attributes by a first unique mapping function performed in the core network node. Preferably, a plurality of first sets is preconfigured in the core network node and the mapping function performs a selection from the preconfigured sets according to the selected service class.

Furthermore, a second transmission context is established between the access node and the user equipment. The second transmission context is associated with a second set of attributes and defines a second quality of service for the exchange of the data packets with the user equipment in the transmission. The selected service class determines the second set of attributes by a second unique mapping function performed in the access node. Preferably, a plurality of second sets is preconfigured in the access node and the mapping function performs a selection from the preconfigured sets according to the selected service class.

In this way the selected service class defines the handling of the data packets on the links controlled by the access node and the core network node and thus the quality of service for the data packets sent between the service entity and the user equipment on the links to which the respective contexts relate.

Preferably, the first and second qualities of service are identical or correspond to each other. It is possible that said first and second sets of attributes are sub-sets of larger sets of attributes which may also comprise attributes which are specified in another way, e.g. which are preconfigured to fixed values. It should also be noted that different service classes can, via the mapping function, relate to the same first or second set of attributes, i.e. the number of service classes may be larger than the number of possible sets of attributes.

The proposed method allows a simple specification of the quality of service which the nodes in a mobile network use for the handling of data packets. Due to the attributes being specified by the service classes, the specifications can easily be forwarded between the nodes in the mobile network without major adaptations of existing systems. The method simplifies it also for operators to specify how the resources controlled by the nodes in a mobile network are shared between different levels of service because the operators can specify the resources based on the service classes without the necessity to define resources based on attributes. A further advantage of the proposed method is that it can be used in existing mobile communication systems after only minor adaptations in the devices.

In present mobile systems, messages are already existing which forward sets of attributes for the contexts between nodes. In a preferred embodiment of the invention, the selected service class is specified by a third set of attributes which is forwarded to at least one of the core network node and the access node, preferably to both. The first and/or second mapping functions determine then the first set of attributes and/or the second set of attributes from the third set of attributes, i.e. according to the service class. This allows to use existing messages in mobile communication systems for the forwarding of the service class information to and between nodes. In other words, the selected service class is encoded as a combination of attribute values in the third set. It is neither necessary that all possible combinations of attribute values relate to a service class nor that all attributes in the third set are used to determine the coded service class.

Preferably, the number of service classes is small compared to the number of possible combinations of values in the third set of attributes. A small number of service classes allows an easy configuration of the quality of service by the operator. On the other hand, the number of service classes must correspond to the required granularity of service differentiation.

It is advantageous, to define the first and/or second mapping function by a mapping table. For example, the service class can indicate a row in the table which contains a set of attributes. The mapping table can be specified during the configuration of the node. It allows a fast and simple processing of the service classes by the respective nodes and an easy configuration.

Preferably, a specification of the selected service class is forwarded from the service entity to the core network node because the service entity is generally aware of the requirements for the quality of service in a data transmission. It is, however, possible that the specifications of the service entity are modified, e.g. in an edge node of the core network, if the operator determines that the selected service class should be changed according to the user's subscription. The service entity can specify the requirements for example by packet marking or by using a defined flow for the packets. In this case, an edge node of the core network may determine the selected service class from the marking or the flow and forward the specification of the corresponding service class to the core network node. For example, an operator can define two service classes each corresponding to a specific packet marking. Based on those two specific markings, the edge node can then select a first of these service classes for users with premium subscriptions and a second service class for all other users.

Apart from the core network node and the access node, the data packets can also be forwarded by other entities which can affect the quality of service for the transmission. For example, scheduling entities on different links may delay the data packets. A scheduling entity controlled by the access node, typically in the node B, schedules the transmission of the data packets on a radio link. In this case, the access node preferably controls the scheduling entity according to the selected service class.

In an advantageous embodiment, the first mapping function performed in the core network node is identical to the second mapping function performed in the access node, i.e. the first and second sets of attributes are identical and the same quality of service is specified for all links. However, the properties of different links may deviate significantly from each other and different sets and different mapping functions can be more advantageous in this case.

Preferably, a configuration procedure defines at least one item from a group comprising the plurality of service classes, the first mapping function, and the second mapping function, e.g. the contents of a mapping table. The procedure can be initiated by an operation support system (OSS) of the mobile network which allows it for the operator of a mobile network both to specify and change the corresponding parameters. Configuration procedures can also specify and change resources, which are attributed to all or selected of the service classes in said plurality of service classes. In this way, reserved resources for mandatory services like emergency calls or system signaling as well as reserved bandwidths for users with premium subscriptions can be attributed.

The invention is also embodied in a control device for a mobile network which is adapted to perform the transmission of data packets between a service entity and a user equipment and which comprises a core network node and an access node. The nodes are adapted to control the handling of data packets sent between the service entity and the user equipment. The control device may be one of these nodes or it may be a further device in the mobile network. A plurality of service classes relating to a quality of service are preconfigured in the mobile network.

The control device comprises a memory in which a unique mapping function is stored. The function relates the service classes to attributes defining the quality of service for the transmission of the data packets. A processing unit is adapted to determine a selected service class for the transmission from said plurality, for example according to parameters in a set-up message for a transmission context. The processing unit is further adapted to specify a set of attributes from the selected service class using the unique mapping function, preferably using a set of values for the attributes stored in the memory for the respective service class, i.e. the mapping function can for example be defined in a mapping table. The processing unit is also adapted to establish a transmission context with the user equipment. The transmission context is associated with the set of attributes which define the quality of service for the exchange of the data packets with the user equipment in the transmission. A control unit controls the forwarding of the data packets according to said set of attributes.

The control device can, for example, be a serving general packet radio service support node SGSN, a gateway general packet radio service support node GGSN, an enhanced gateway general packet radio service support node, a radio network controller RNC, a base station controller, a base transceiver station, or a Node B. The control device can be adapted for use in any embodiment of the method as described above.

The invention can also be embodied in a program unit comprising code for performing those steps of a method described above which relate to a single device. The program unit according to the invention is for example stored on a data carrier or loadable into a processing unit of a control device, e.g. as a sequence of signals.

The foregoing and other objects, features and advantages of the present invention will become more apparent in the following detailed description of preferred embodiments as illustrated in the accompanying drawings.

DETAILED DESCRIPTION

Figure 1:
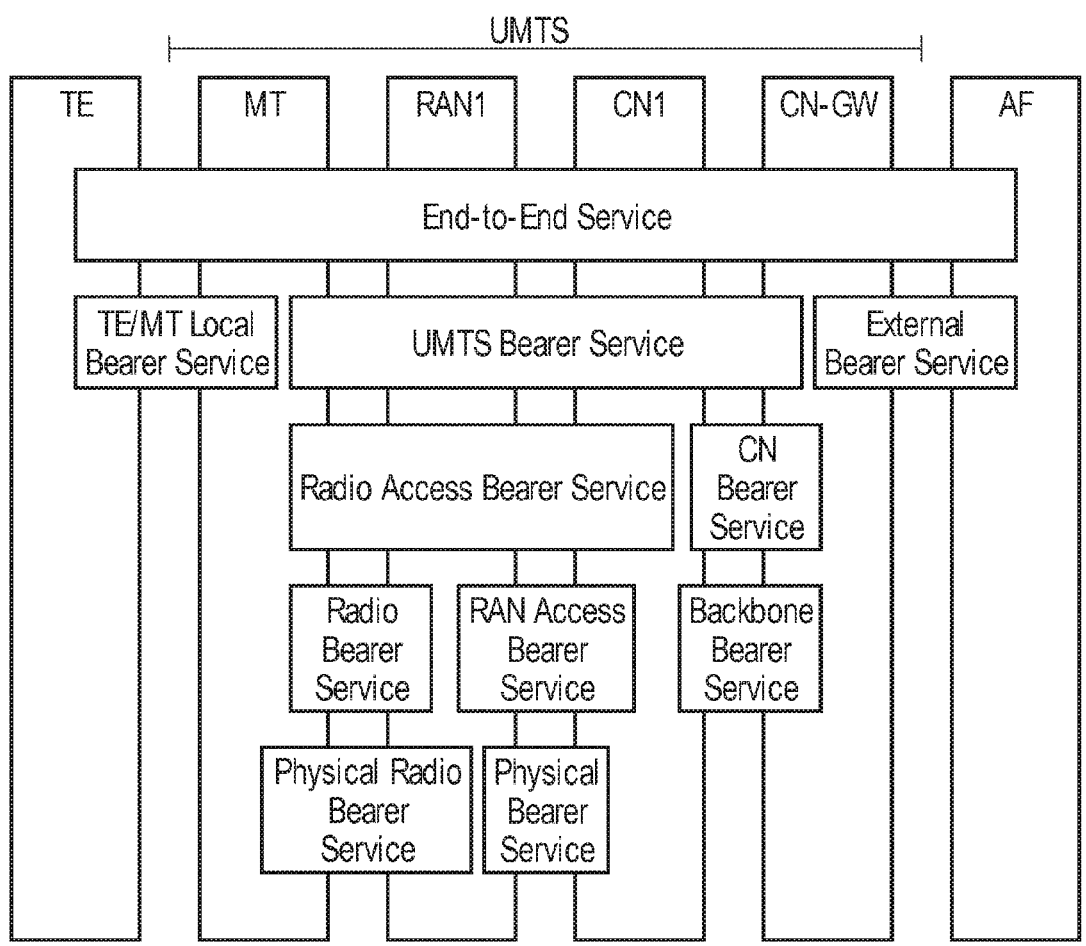
FIG. 1 shows an architecture for providing a defined quality of service in a mobile system.

FIG. 1 illustrates a quality of service concept in $3^{rd}$ generation mobile systems as specified in technical specification 3GPP 23.107 V 6.3.0. of the $3^{rd}$ Generation Partnership Project. Traffic comprising data packets is sent between a service entity (AF) and a user equipment comprising a terminal equipment (TE) and a mobile terminal (MT). The service entity may be a server which could be located in the operator's network or in an external network but it can be also another user equipment. The object of the concept is to provide a defined quality of service (QoS) on the application level using the bearer services of the underlying levels. Those bearer services are specified by contexts comprising attributes for defining the QoS of the respective bearer service. As the quality of the end-to-end service on the application layer depends on the specifications of the underlying levels, the contexts of the bearer services need to be specified with respect to the required end-to-end quality of service.

The TE/MT local bearer service forwards the data packets within the user equipment. The packets are received or sent over a radio link with the radio access network (RAN1) of the mobile network. The External Bearer Service is provided by another network which can also be a UMTS (Universal Mobile Telephony System) network, i.e. a network according to 3GPP specifications, another mobile network or a fixed network like a fixed communication system such as the Internet. The external bearer forwards data packets between the service entity (AF) and a gateway node (CN-GW) of the core network of the mobile network. The present invention is especially concerned with specifying the quality of service for the UMTS bearer service.

The core network comprises also a core network node (CN1) which controls the forwarding of packets between core network and radio access network (RAN1). Gateway node (CN-GW) and core network node (CN1) can be the same node. The data packet traffic through the mobile network is sent over a Radio Access Bearer Service between mobile terminal (MT) and core network node (CN1) and over a Core Network Bearer Service between Gateway node (CN-GW) and core network node (CN1). These Services are in turn provided by a Radio Bearer Service on the radio link between user equipment and radio access network (RAN1), a RAN Access Bearer Service between radio access network (RAN1) and core network node (CN1) and a Backbone Bearer Service within the core network. Ultimately, all services depend on different physical bearer services on the respective links, i.e. typically a plurality of contexts and services relate to individual links in a transmission. A sufficient quality of service is especially important on bottleneck links in the transmission which limit the total quality of service. For mobile networks, the bottleneck link is typically the wireless link between radio access network and mobile terminal.

Figure 2:
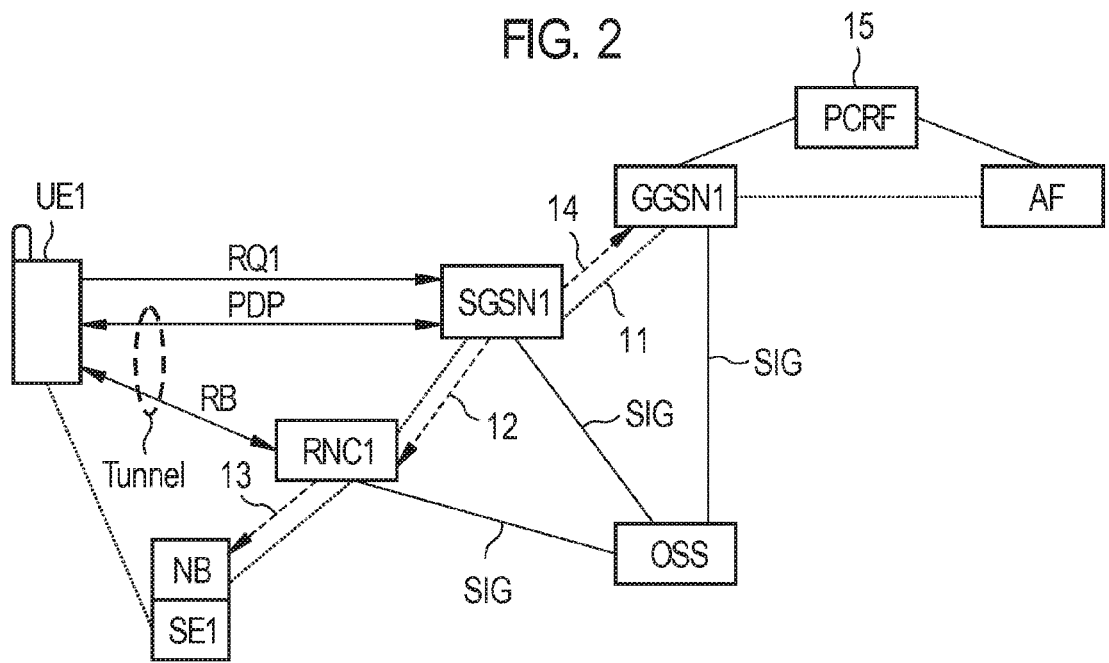
FIG. 2 shows the cooperation of nodes in a mobile system in which the invention is embodied.

FIG. 2 shows an example of a transmission of data packets using the proposed method with involved contexts and nodes. For the transmission of the data packets, a PDP context is negotiated between the user equipment (UE1) and a core network node, here an SGSN (SGSN1). The transmission is later performed between core network node and access node or at least controlled by them. The dotted line 11 indicates a possible way on which the packets are forwarded in up-link and down-link direction between the user equipment (UE) and the service entity (AF).

The set up of the PDP context can for example be initiated by a corresponding request (RG1) from the user equipment to the SGSN. It is also possible that the network (e.g., the GGSN) requests the set up of the PDP context, for example by a message to the user equipment which then initiates the sending of a request (RG1) to activate a PDP context.

The PDP context comprises attributes which define the quality of service for the packet transmission. The establishment of a radio bearer is typically included in the establishment of a PDP context. For that purpose, the SGSN (SGSN1) sends a request (12) for establishment of a radio bearer to an access node, in the example an RNC (RNC1). In the state of the art, the request comprises those attributes of the PDP context which are required to establish the radio bearer in line with the quality of service negotiated in the PDP context. The transmission of the data packets on the radio link to the user equipment is for example performed by a node B (NB) which is controlled by the RNC using radio resource control signaling (13). It is also possible to integrate the functionality of the node B and the RNC in a single node. The node B comprises a scheduling entity (SE1) which distributes the arriving packets on the available resources, e.g. on shared or dedicated channels. As the handling of the packets by the scheduler is important for the quality of service of the transmission, the scheduler must also be controlled according to the required quality of service. The SGSN sends also a request (14) to an edge node of the core network, here a GGSN (GGSN1), for the establishment of a core network bearer.

The proposed method defines a fixed number of service classes and associates a pre-configured quality of service with each service class. A service class can further be associated with a service class type. For example a scheduler, e.g. scheduling entity (SE1), may distinguish three types of service classes: Signaling (SIG), Guaranteed Bit Rate (GBR), and Best-Effort (BE). The configuration defines service class types and which services or service components are associated with which service class type.

The attributes defining the quality of service relating to a particular service class are also preconfigured. Especially those attributes for the service class that apply to any user are preferably configured from the operation support system (OSS) using configuration messages (SIG). Examples for such attributes are an Operator Defined Scheduling Priority (ODSP) or other attributes for the service class like 'Committed Rate' and 'Peak Rate'. Also attributes for the service class on a specific link, e.g. for the radio bearer on the radio link, are preferably configured from the operation support system. Quality of service attributes that are specific to both service class and subscriber like uplink-GBR, downlink-GBR, and uplink-MBR (minimum bit-rate) can be configured by the set-up request for a context, e.g. the 'RAB Assignment'. In this case the establishment request (12) for a context comprises both an indication of the service class and attributes relating to the subscriber. The uplink-MBR is relevant for a BE service class since the radio access network, i.e. the uplink scheduler in the Node-B, performs uplink rate policing. The quality of service attribute uplink-MBR is optional for GBR service classes and might be applied for variable rate codecs (e.g., AMR) or rate-adaptive services.

The requirements for the quality of service are determined by the service executed on the application layer, e.g. in an application client executed in the user equipment. For example, a speech call in a telephone has strict delay requirements while a streaming service with a packet buffer may tolerate moderate delays and jitter. Accordingly, either the service entity (AF) or the user equipment (UE1) specifies the required quality of service, for example by marking of the data packets sent or by selecting a flow for the packets. The operator can then configure service classes which relate to selected packet markings or to flows with selected properties. Examples of services an operator may wish to offer could be Internet Access with low data rate, Premium Internet Access with high data rate, voice over IP telephony including Emergency Calls or "weShare" which allows users to share media during an ongoing telephone call.

In at least some of the involved nodes, in the above example in the SGSN and the RNC, the handling of data packets is performed based on the flow of which the packets are part. A flow, e.g. an IP flow, is usually defined by 5 parameters, i.e. source and destination addresses, source and destination port numbers and protocol identification. It is, however, not mandatory to use all parameters in the definition of the flow handling. In IP networks, it is also possible to handle data packets according to the so-called Differentiated Services Code Point (DSCP), which is carried in the IP header. However, the DSCP is not part of the definition of a flow and many nodes in a mobile communication system are not able to evaluate the respective header fields, e.g. because they handle packets after a fragmentation or encryption performed during the transmission.

Therefore, the service class identifies preferably flows or aggregates of flows that are associated with the same quality of service. The number of service classes defined by an operator corresponds to the granularity of service differentiation that the operator wishes to achieve. Often, 4 to 8 service classes are suitable to allow both a sufficient service differentiation and to allow a simple system configuration. In other cases, a higher number of service classes is more appropriate to allow a better service differentiation. The packet treatment by different nodes can also be defined differently. For example, some nodes, e.g. the GGSN, can be adapted to handle packets for each service class in a different way. Other nodes may map several service classes to the same attributes, i.e. packet treatment, for example if the quality of service depends mainly on a single parameter like the scheduling priority.

Different applications may be executed simultaneously in the user equipment (UE1) and these applications may exchange data packets with different service entities. Different service entities may send data packets with different user equipments as destinations to the same edge node of the mobile network. Packet filters in the user equipment for distinguishing data packets related to different applications and in the edge node for distinguishing data packets relating to different service entities ensure that the packets are sent to the correct destination. Also packets for the same destination can correspond to different service classes and need to be associated by the packet filters accordingly.

For example, an application-layer service, provided from the service entity (AF), e.g. directly by the operator or via peering with a service provider, can include multiple service components each associated with a particular flow. An operator's policy may define that each of the flows should be associated with a different quality of service. For example, an IMS (IP Multimedia Subsystem) service can comprise a signaling flow of the session initiation/session description protocol (SIP/SDP), a flow for voice, a flow for video, and a flow for file sharing each associated with different quality of service. Alternatively, some or all of the flows may be multiplexed on the same quality of service, for example SIP/SDP together with VoIP.

Therefore, a packet filter preferably filters a stream of data packets with one or potentially multiple flows or service classes of potentially multiple applications or service components into separate streams, i.e., associates packets with a particular service class, or associates packets with a particular PDP context. A packet filter can be defined by a so-called Traffic Flow Template (TFT) that applies to uplink or downlink. For the downlink, 3GPP specifications also define a PCC (Policy Charging and Control) filter that can be used instead of a downlink TFT.

The flow between the user equipment and the edge node of the core network, e.g. a GGSN, is mapped and potentially multiplexed together with other flows onto a dedicated logical tunnel. In the non-access stratum between user equipment and core network, the tunnel is represented by a PDP context while in the access stratum between user equipment and radio access network it is represented by a radio bearer (RB). The quality of service for a flow in the tunnel is specified by the service class that is associated with each PDP context and the corresponding radio bearer, i.e. there is a one-to-one relationship between the PDP context and the radio bearer. Although a tunnel only relates to a single service class, it can accommodate multiple flows each having different quality of service requirements if they are not distinguished by packet filters. For example, the service "Internet Access" can carry flows from diverse applications such as Skype and FTP (File Transfer Protocol).

Within the tunnel, packet markings do not need to be considered. By mapping a flow onto a tunnel represented by the pair of PDP context and radio bearer with the associated service class for associating a flow with quality of service, packet marking between user equipment and GGSN to associate the flow with the quality of service is not required. This allows a smooth migration of deployed infrastructure based on existing 3GPP specifications. However, packet marking may still be used outside the tunnel to signal packet-specific quality of service requirements, for example to the user equipment or an edge node of the core network. Accordingly, between inter-connecting backbones of different operators, or between the GGSN and the service entity, packet classification and marking functions could be used.

Packet marking is one option to signal to the edge node of the core network which service class shall be used for the data packets. The edge node can then select the service class accordingly. The edge node can also perform other quality-related functions, e.g. rate policing or admission control in order to avoid congestion in the mobile network.

Service differentiation allows that an operator controls the distribution of network resources among the services provided. Service differentiation is, e.g., achieved by priority-based packet scheduling between packets of different service classes. In contrast, user differentiation allows to control the allocation of network resources to a specific subscriber. For example, if two users both have subscribed to the service "Internet Access" one may have subscribed to a "standard option" with lower bit-rate (e.g. uplink/downlink=200/100 kb/s) while the other subscriber may have subscribed to a "premium option" with higher bit-rate (e.g. uplink/downlink=500/250 kb/s). User differentiation is, e.g., achieved by rate policing per PDP context or radio bearer in uplink and/or downlink. In general, user differentiation can also be performed by reserving service classes to different user groups and attributing users to the service classes depending on their subscription alternatively to or in consideration of a requested quality of service.

The proposed method provides an effective but simple solution to perform service differentiation by introduction of a fixed number of service classes each associated with a defined quality of service, i.e. by pre-configuring the quality of service that is associated with each service class, e.g. by operator policy, and to control the distribution of network resources among the service classes of the services provided. Preferable embodiments do not require changes to the protocols and attributes defined in current 3GPP specifications. It is therefore possible to use the existing protocols and attributes to allow an operator to provide service differentiation based on service classes. The proposed method can also reduce time-to-market for operator deployment of new services because today a new service with defined bit rate requires a new radio access bearer if the required rate is not standardized. Using service classes, operators can use reserved service classes to test new services without standardization.

Present 3GPP specifications do not provide service classes so that in view of the number of quality of service attributes and the corresponding value ranges, the number of service classes that can be defined is huge. This makes it difficult for an operator to control the distribution of network resources among the service components of all the services provided and constitutes an obstacle to providing service differentiation.

Operator control over service differentiation can be performed by network-controlled procedures to control the establishment of tunnels, the assignment of a service class per tunnel, and the multiplexing of flows onto a tunnel in uplink and downlink direction. In the prior art, only user equipment-controlled versions of these procedures are specified. As described above, there are two mechanisms for an operator to control the distribution of network resources among the different service classes. The operation support system can configure quality of service attributes that apply to all users. In addition, the request for setting up a context can specify attributes that are specific to both service class and subscriber, e.g. the 'RAB Assignment' to control uplink-GBR, downlink-GBR, and uplink-MBR. In present mobile systems, the 'RAB Assignment' for a GBR radio access bearer always triggers admission control and results in session management signaling to the user equipment. This precludes the possibility for the network to pre-establish a GBR radio access bearer without reserving resources to reduce setup delays although this is an option to reduce setup delays. It is also not possible to trigger admission control without associated session management signaling to the user equipment. These options are enabled by the proposed method. Finally, the invention is also applicable for service control in the service layer (e.g., IMS) and fixed-mobile convergence.

The proposed method is especially appropriate for shared channels on the radio link (e.g. in HSPA and Super3G). Some operators provide each service from a separate access packet network. In this case, multiplexing is facilitated in the radio access network of PDP contexts with the same service class but from different access packet networks on the radio link. However, the use of dedicated channels is also possible for the proposed method. Preferably, the radio access network is free to decide whether to realize a radio bearer using a shared or a dedicated channel if the required quality of service can be ensured in both ways. It is possible that a user equipment has different contexts of the same service class.

Preferably, a scheduler in the radio access network then maps all flows from the contexts onto a single link layer flow (MAC—medium access control) on the radio link.

In a preferable embodiment, combinations of existing quality of service attribute values define the service class represented by a service class identifier (ID). Since there is no quality of service attribute defining the service class identifier in present 3GPP specifications, combinations of existing quality of service attribute values implicitly define the new quality of service attribute service class identifier. In other words, quality of service attribute values are re-interpreted as encoding a service class.

This means that individual attribute values for the quality of service are not used directly to specify the packet handling but they are reinterpreted as constituting a part of the service class definition. When receiving a request for radio bearer assignment, the access node, e.g. the RNC, initially ignores those quality of service attributes that do not define the service class. Thus, arbitrary values for, e.g., uplink-GBR (guarantied bit-rate), downlink-GBR, and uplink-MBR (minimum bit-rate) can be used in the assignment request if these attributes are not evaluated. However, if the attributes defining the service class indicate a service class in which also user-specific attributes are considered, attributes that do not define the service class are evaluated in addition for specifying the user-specific quality of service.

As an example, for a PDP context a service class can be a pointer to the quality of service received by the flows that are multiplexed onto that PDP context. A set of attributes in accordance with the service class is preferably preconfigured in the core network node. In the same way, a radio bearer is associated with the service class. Within the radio access network, the radio bearer represents a tunnel per user equipment that is associated with a corresponding PDP context. A user equipment may have multiple tunnels simultaneously, i.e. combinations of PDP context and radio bearer.

In an example shown in

Table 1, the second column indicates a suitable coding of the service class. For example, the combination of the attributes "interactive", "signaling indication=Yes" and "THP=1" is interpreted to specify service class ID "3". Consequently, the quality of service attribute 'Traffic Handling Priority (THP)' is not interpreted as a scheduling priority. Instead, the Operator Defined Scheduling Priority is read from the line of the table corresponding to service class ID "3" and used to control the packet handling. Likewise, the quality of service attribute 'Signaling Indication' is not interpreted as specified in 3GPP TS 23.107 but is used to define the service class.

TABLE 1

Example of encoding Service-Class-IDs and associating radio access bearers with QoS attributes and a radio bearer realization.

| Service-Class-ID | Encoding of the Service-Class-ID by existing QoS attributes | Type of Flow Class | Operator Defined Scheduling Priority (ODSP) as assigned from OSS) | Uplink-GBR and downlink-GBR | Uplink-MBR | HS-DSCH/E-DCH RB Realization (Association to Service class ID assigned from OSS) |
|---|---|---|---|---|---|---|
| 1 | "conversational" | GBR | 2 | Assigned via 'RAB Assignment' | Assigned via 'RAB Assignment' (Optional) | "RLC/UM" + "optimizations for VoIP" (if needed) |
| 2 | "streaming" | GBR | 3 | Assigned via 'RAB Assignment' | Assigned via 'RAB Assignment' (Optional) | "RLC/AM" + "optimizations for Video" (if needed) |
| 3 | "interactive" + "signaling indication = Yes" + "THP = 1" | SIG | 1 | N/A | Assigned via 'RAB Assignment' | "RLC/AM" + "optimizations for SIG" (if needed) |
| 4 | "interactive" + "signaling indication = No" + "THP = 1" | BE | 4 | N/A | Assigned via 'RAB Assignment' | "RLC/AM" + "no specific optimizations" (mostly TCP/IP) |
| 5 | "interactive" + "signaling indication = No" + "THP = 2" | BE | 5 | N/A | Assigned via 'RAB Assignment' | See Flow Class 4 |
| 6 | "interactive" + "signaling indication = No" + "THP = 3" | BE | 6 | N/A | Assigned via 'RAB Assignment' | See Flow Class 4 |
| 7 | "background" | BE | 7 | N/A | Assigned via 'RAB Assignment' | See Flow Class 4 |

The other columns of table 1 specify the parameters of the radio bearer for the access node for the specific service class. Correspondingly, table 1 consists of two sub-tables, the left columns specifying the encoding of the service classes and the other columns specifying the setting of the attributes according to the service classes. Table 2 shows another example of encoding service classes. Here, a further parameter (Allocation/Retention Priority ARP) is used in the definition of the service class to allow defining a higher number of service classes. A corresponding table defines also the attributes relating to each service class but is omitted here for simplicity.

TABLE 2

Further example of encoding Service-Class-IDs.

| Service Class Identifier | Service Class Encoding |
|---|---|
| 0 | Reserved for signaling |
| 1 | "interactive" + "signaling indication = Yes" + "THP = 1" |
| 2 | "conversational" + "ARP = 1" |
| 3 | "conversational" + "ARP = 2" |
| 4 | "conversational" + "ARP = 3" |
| 5 | "streaming" + "ARP = 1" |
| 6 | "streaming" + "ARP = 2" |
| 7 | "streaming" + "ARP = 3" |
| 8 | "interactive" + "signaling indication = No" + "THP = 1" + "ARP = 1" |
| 9 | "interactive" + "signaling indication = No" + "THP = 1" + "ARP = 2" |
| 10 | "interactive" + "signaling indication = No" + "THP = 1" + "ARP = 3" |
| 11 | "interactive" + "signaling indication = No" + "THP = 2" + "ARP = 1" |
| 12 | "interactive" + "signaling indication = No" + "THP = 2" + "ARP = 2" |
| 13 | "interactive" + "signaling indication = No" + "THP = 2" + "ARP = 3" |
| 14 | "interactive" + "signaling indication = No" + "THP = 3" + "ARP = 1" |
| 15 | "interactive" + "signaling indication = No" + "THP = 3" + "ARP = 2" |
| 16 | "interactive" + "signaling indication = No" + "THP = 3" + "ARP = 3" |
| 17 | "background" + "ARP = 1" |
| 18 | "background" + "ARP = 2" |
| 19 | "background" + "ARP = 3" |

Figure 3:
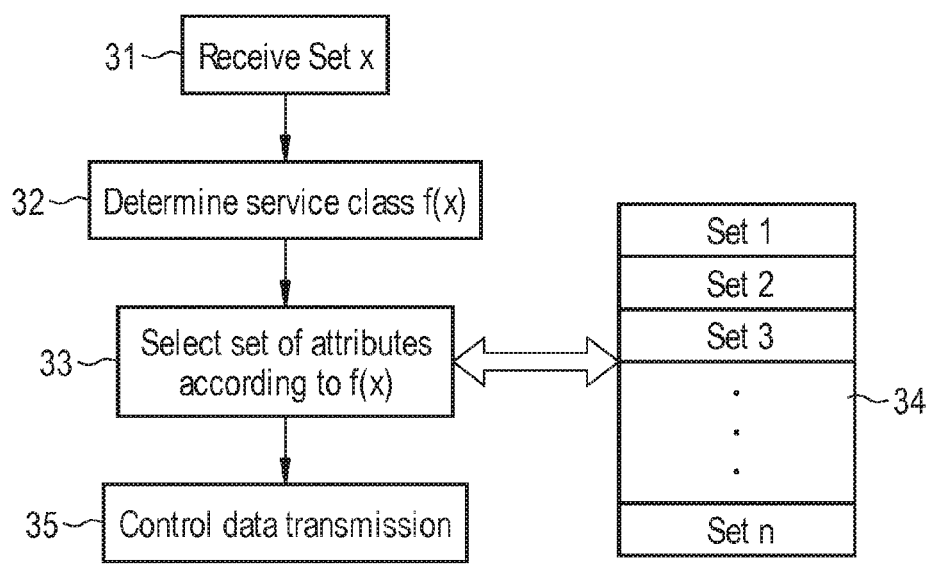
FIG. 3 shows an example of a mapping of service classes.

FIG. 3 further illustrates the setting of attributes for the quality of service in an access node. In a first step of receiving (31), the access node receives a set of attributes for setting up a context. The access node then determines (32) the service class encoded by the attributes using a mapping function. More specifically, the service class is a pointer to a different set of attributes, which is selected (33) from a plurality of sets (34) specified earlier during a configuration procedure of the access node. The access node then performs control (35) over the transmission of data packets associated with the context according to the selected set of attributes. If the establishment request for a context comprises both an indication of the service class and attributes relating to the subscriber those attributes relating to the service class are used to select the set of attributes while the other attributes relating to the user can be used to modify the set, i.e. to perform user differentiation.

Preferably, all entities controlling the handling of packets, e.g. the radio access node, SGSN, GGSN, or a PCRF (Policy and Charging Rules Function) are adapted to handle service classes. In one option, the PCRF (15) has interfaces to the service entity (AF) and the GGSN (GGSN1). Accordingly, it can signal the attributes encoding the service class and the GGSN as edge node transparently forwards the encoded service class. Alternatively, the PCRF (15) only signals the numerical value of a service class ID and the GGSN then maps the ID to the corresponding encoding. The service layer, e.g. the PCRF, defines the mapping between the operator-provided service components to service classes, and the mapping of service classes to service class types (e.g. GBR, SIG or BE). Admission control may be limited to flows of service class type GBR.

Figure 4:
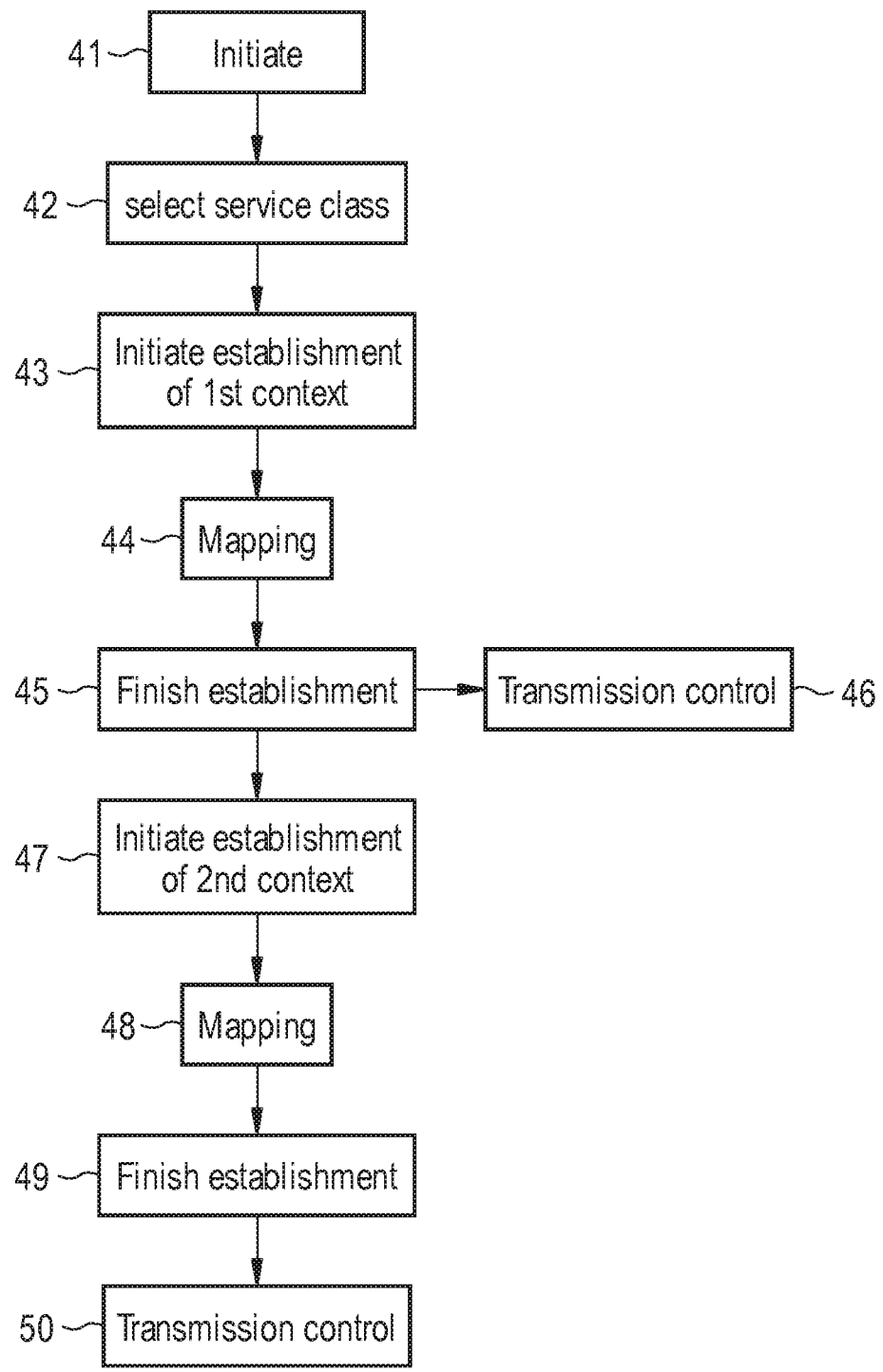
FIG. 4 shows a flow chart of a method according to the invention.

FIG. 4 shows a method according to the invention. The method specifies the quality of service in a transmission of data packets between a service entity and a user equipment over a mobile network comprising a core network node and an access node which are adapted to control the handling of data packets sent between the service entity and the user equipment.

In a first step (41), a transmission between a service entity and a user equipment is initiated. In a selection (42), a service class is selected for the transmission from a plurality of service classes relating to the quality of service which are preconfigured. After the selection (42), the selected service class is communicated to the core network node. The establishment (43) of a first transmission context is initiated between the core network node and the user equipment. The first transmission context is associated with a first set of attributes for defining a first quality of service for the exchange of the data packets with the user equipment in the transmission. The first set is determined in a mapping operation (44) using a unique mapping function which maps the service class to the first set of attributes. After completion (45) of the establishment procedure, transmission control (46) is performed according to the transmission context. In this way, the selected service class defines the handling of the data packets as controlled by the core network node, i.e. the transmission control (46) is performed using the first set of attributes which is specified in the mapping operation (44) according to the service class.

A second establishment (47) of a second transmission context between the access node and the user equipment is also initiated. Typically, the core network node triggers the second establishment (47) after the first establishment is finished although this order of establishment is not essential. The second transmission context is associated with a second set of attributes which define the quality of service for the exchange of the data packets with the user equipment in the transmission as controlled by the radio access node. In a further mapping operation (48), the second set of attributes is determined in a unique mapping function from the selected service class. After completion (49) of the context establishment, the selected service class defines accordingly also the handling of the data packets controlled by the access node in transmission control (50).

Figure 5:
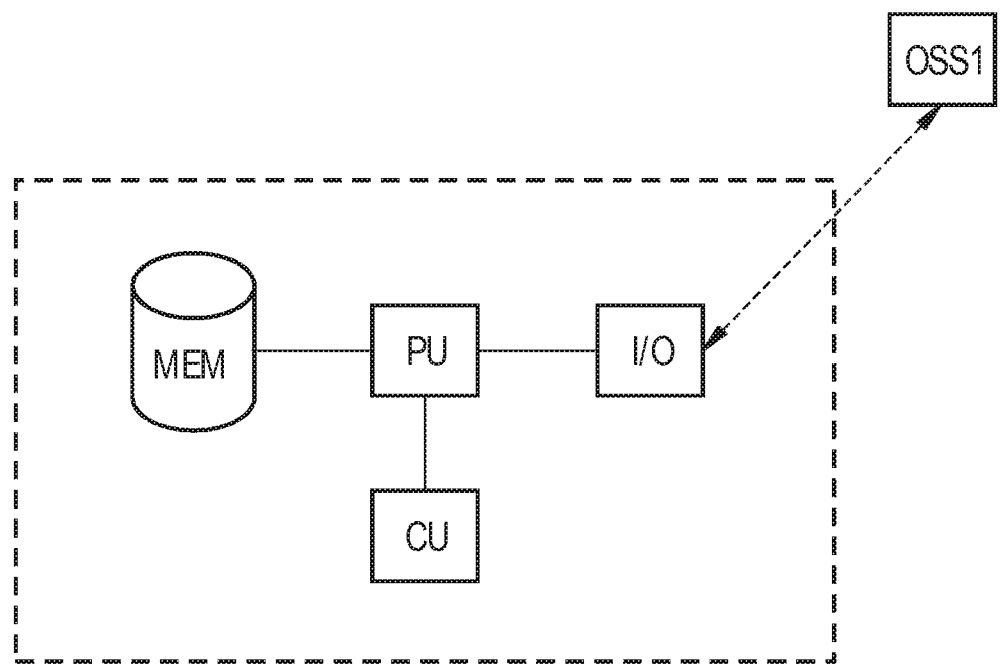
FIG. 5 shows a device according to the invention.

FIG. 5 shows a device according to the invention, for example a serving general packet radio service support node SGSN, a gateway general packet radio service support node GGSN, an enhanced gateway general packet radio service support node, a radio network controller RNC, a base station controller, a base transceiver station, or a node B. The device has a memory unit (MEM) for storing different sets of service attributes. It has also an input/output unit (10) for receiving and sending data packets and receiving messages specifying a selected service class for a bearer. A processing unit (PU) is adapted to perform a method as described above. Especially, the processing unit can determine the selected service class from a received message and set up a corresponding bearer to a further device handling the packets. According to the determined selected service class, the processing unit retrieves a corresponding set of attributes from the memory (MEM) and initiates a control unit (CU) adapted to handle packets sent in the tunnel according to the attributes. The control unit (CU) then handles the packets according to the attributes retrieved from the memory, i.e. according to the selected service class. In a preferable embodiment of the invention, the processing unit (PU) determines the selected service class from a set of attributes in the received message. The input/output unit (10) also allows exchanging messages with an operation support system (OSS1) for configuring the device, especially to define and update the attribute sets in the memory (MEM).

The units of the control device can be embodied as electronic or optical circuitry or as software executed in such circuitry.

The above embodiments admirably achieve the objects of the invention. However, it will be appreciated that departures can be made by those skilled in the art without departing from the scope of the invention which is limited only by the claims.

The invention claimed is:

1. A method implemented by a control device for specifying a quality of service in a transmission of data packets between a service entity and a user equipment over a mobile network comprising a core network node and an access node which are adapted to control the handling of the data packets sent between the service entity and the user equipment, wherein the method comprises:
    receiving a set of attributes for a transmission context to be established with the user equipment, wherein the set of attributes encodes a selected service class, wherein the selected service class was selected for the transmission context prior to receipt of the set of attributes and was selected from a plurality of service classes preconfigured in the mobile network,
    determining the selected service class from the received set of attributes using a unique mapping function,
    determining a further set of attributes for the selected service class, using the unique mapping function that maps said set of attributes for the determined selected service class to said further set of attributes of a plurality of preconfigured further sets of attributes, and
    establishing the transmission context with the user equipment according to the further set of attributes for defining a quality of service for an exchange of the data packets with the user equipment in the transmission.

2. The method according to claim 1, further comprising scheduling, using a scheduling entity controlled by the access node, the transmission of the data packets on a radio bearer, the access node controlling the scheduling entity according to the selected service class.

3. The method according to claim 1, wherein the received set of attributes encodes an identifier of the selected service class, and wherein the unique mapping function maps said identifier of the selected service class to said further set of attributes.

4. The method of claim 1, further comprising pre-establishing a guaranteed bit rate radio access bearer without reserving resources.

5. The method of claim 1, further comprising triggering admission control without associated session management signaling to the user equipment.

6. The method of claim 1, wherein the transmission context is a Packet Data Protocol (PDP) context.

7. The method of claim 1, wherein the control device is a serving general packet radio service support node, a gateway general packet radio service support node, an enhanced gateway general packet radio service support node, a radio network controller, a base station controller, a base transceiver station, or a node B.

8. A method implemented by a control device for specifying a quality of service (QoS) in a transmission of data packets between a service entity and a user equipment over a mobile network comprising a core network node and an access node which are adapted to control the handling of the data packets sent between the service entity and the user equipment, wherein the method comprises:
    receiving a set of QoS attributes for a transmission context to be established with the user equipment;
    determining a service class identifier encoded by the set of QoS attributes, using an attribute-to-identifier mapping that maps different possible combinations of QoS attribute values to different service class identifiers, wherein said identifiers identify different preconfigured service classes;
    mapping the determined service class identifier to a different set of QoS attributes, using an identifier-to-attribute mapping that maps different service class identifiers to different preconfigured sets of QoS attributes defining said different preconfigured service classes; and
    establishing the transmission context with the user equipment according to said different set of QoS attributes for defining said QoS in said transmission.

9. The method of claim 8, further comprising pre-establishing a guaranteed bit rate radio access bearer without reserving resources.

10. The method of claim 8, further comprising triggering admission control without associated session management signaling to the user equipment.

11. The method of claim 8, wherein the transmission context is a Packet Data Protocol (PDP) context.

12. The method of claim 8, wherein the control device is a serving general packet radio service support node, a gateway general packet radio service support node, an enhanced gateway general packet radio service support node, a radio network controller, a base station controller, a base transceiver station, or a node B.

13. A method implemented by a control device for specifying a quality of service in a transmission of data packets between a service entity and a user equipment over a mobile network comprising a core network node and an access network node which are adapted to control the handling of the data packets sent between the service entity and the user equipment, wherein the control method comprises:
    receiving a numerical ID value for a transmission context to be established with the user equipment, wherein the numerical ID value encodes a selected service class, wherein the selected service class was selected for the transmission context prior to receipt of the numerical ID value and was selected from a plurality of service classes preconfigured in the mobile network;
    determining the selected service class from the received numerical ID value;
    determining a further set of attributes for the selected service class, using a unique mapping function that maps a set of attributes for the determined selected service class to said further set of attributes of a plurality of preconfigured further sets of attributes; and
    establishing the transmission context with the user equipment according to the further set of attributes for defining a quality of service for an exchange of the data packets with the user equipment in the transmission.

14. The method of claim 13, further comprising:
    receiving a request for establishment of the transmission context, wherein the request comprises both an indication of the determined selected service class and attributes relating to a subscriber; and
    using the attributes relating to the subscriber to perform user differentiation.

15. The method of claim 14, wherein using the attributes relating to the subscriber to perform user differentiation comprises reserving service classes to different user groups and attributing users to the service classes depending on their subscription alternatively to or in consideration of a requested quality of service.

16. The method of claim 13, further comprising applying a packet filter to filter a stream of data packets with one or more flows or service classes of one or more applications or service components into separate streams, such that packets are associated with a particular service class.

17. The method of claim 16, wherein the packet filter is defined by a Traffic Flow Template (TFT) that applies to uplink or downlink packet streams or a Policy charging and Control (PCC) downlink filter.

18. The method of claim 13, wherein in a non-access stratum between the user equipment and the core network node, a first tunnel is represented by a Packet Data Protocol (PDP) context, and wherein in an access stratum between the user equipment and an access network node a second tunnel is represented by a radio bearer, wherein the transmission context is the first or the second tunnel.

19. The method of claim 18, wherein the quality of service for a flow in the first tunnel and the second tunnel is specified by a service class that is associated with each Packet Data Protocol (PDP) context and the corresponding radio bearer, such that a one-to-one relationship between the PDP context and the radio bearer exists.

20. The method of claim 13, wherein entities controlling the handling of the packets, including a Serving General Packet Radio Service Support Node (SGSN), a Gateway General Packet Radio Service Support Node GGSN (GGSN), or a Policy and Charging Rules Function (PCRF), are configured to handle service classes.

* * * * *

UNITED STATES PATENT AND TRADEMARK OFFICE
CERTIFICATE OF CORRECTION

| | | |
|---|---|---|
| PATENT NO. | : 9,560,669 B2 | Page 1 of 2 |
| APPLICATION NO. | : 14/943506 | |
| DATED | : January 31, 2017 | |
| INVENTOR(S) | : Ludwig et al. | |

It is certified that error appears in the above-identified patent and that said Letters Patent is hereby corrected as shown below:

On the Title Page

In Item (72), under "Inventors", in Column 1, Line 3, delete "Ekstrom," and insert -- Ekström, --, therefor.

On Page 2, in Item (56), under "U.S. PATENT DOCUMENTS", in Column 2, Line 8, delete "Liu" and insert -- Liu et al. --, therefor.

On Page 2, in Item (56), under "OTHER PUBLICATIONS", in Column 2, Line 1, delete "Status" and insert -- Static --, therefor.

In the Specification

In Column 7, Line 4, delete "(RG1)" and insert -- (RQ1) --, therefor.

In Column 7, Line 8, delete "(RG1)" and insert -- (RQ1) --, therefor.

In Column 8, Line 65, delete "session initiation/session" and insert -- session initiation protocol/session --, therefor.

In Column 9, Line 12, delete "(Policy Charging and Control)" and insert -- (Policy and Charging Control) --, therefor.

In Column 11, Line 56, delete "(guarantied" and insert -- (guaranteed --, therefor.

In Columns 11 & 12, in Table 1, under "Example of encoding Service-Class-IDs and associating radio access bearers with QoS attributes and a radio bearer realization.", Line 4, delete "OSS)" and insert -- OSS --, therefor.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,560,669 B2

In Column 14, Line 48, delete "(10)" and insert -- (I/O) --, therefor.

In Column 14, Line 64, delete "(10)" and insert -- (I/O) --, therefor.

In the Claims

In Column 17, Lines 8-9, in Claim 17, delete "Policy charging and Control" and insert -- Policy and Charging Control --, therefor.

In Column 17, Lines 26-27, in Claim 20, delete "GGSN (GGSN)," and insert -- (GGSN), --, therefor.